(12) United States Patent
Pang

(10) Patent No.: US 8,056,915 B2
(45) Date of Patent: Nov. 15, 2011

(54) STEPPING SCOOTER

(76) Inventor: Mingfang Pang, Shanghai (CN)

( * ) Notice: Subject to any disclaimer, the term of this patent is extended or adjusted under 35 U.S.C. 154(b) by 0 days.

(21) Appl. No.: 12/171,292

(22) Filed: Jul. 10, 2008

(65) Prior Publication Data

US 2010/0001487 A1    Jan. 7, 2010

(30) Foreign Application Priority Data

Jul. 2, 2008    (CN) .......................... 2008 1 0040103

(51) Int. Cl.
  *B62M 1/00*    (2010.01)
  *B62M 1/04*    (2006.01)

(52) U.S. Cl. ........ 280/221; 280/210; 280/220; 280/252; 280/256

(58) Field of Classification Search .................. 280/200, 280/210, 220, 221, 252, 253, 255, 256, 257
See application file for complete search history.

(56) References Cited

U.S. PATENT DOCUMENTS

| | | | | |
|---|---|---|---|---|
| 1,667,940 A | * | 5/1928 | Life | 280/257 |
| 2,118,640 A | * | 5/1938 | Bergen | 280/221 |
| 3,647,241 A | * | 3/1972 | Huyssen | 280/221 |
| 6,419,251 B1 | * | 7/2002 | Chueh | 280/221 |
| 6,439,590 B1 | * | 8/2002 | Liang | 280/221 |
| 6,716,141 B2 | * | 4/2004 | Bhoopathy | 482/51 |
| 7,300,065 B2 | * | 11/2007 | Tal | 280/221 |
| 7,377,532 B2 | * | 5/2008 | Bauce | 280/221 |
| 7,497,453 B2 | * | 3/2009 | Fan | 280/252 |
| 7,621,547 B1 | * | 11/2009 | Fan | 280/221 |
| 2003/0098566 A1 | * | 5/2003 | Christensen et al. | 280/221 |

* cited by examiner

*Primary Examiner* — Anne Marie Boehler
*Assistant Examiner* — Marc Scharich

(57) ABSTRACT

A stepping scooter includes a scooter body for supporting a rider, a moving system, a driving system and a steering lever. The moving system includes a driving wheel rotatably connected with the scooter body, a driven wheel coaxially aligned with the driving wheel and rotatably connected with the scooter body. The driving system includes a driving arrangement pivotally connected to the scooter body, and a transmission and speeding up arrangement engaged with the driving arrangement to convert a human power applied on the driving arrangement into a rotation power to drive the moving system. When the human power is applied on the driving arrangement, the driving wheel is rotated so as to drive the driven wheel to move forward. On the other hand, the transmission and speeding up arrangement is capable of increasing a transmission velocity twice to save a physical force for the rider at the same time.

15 Claims, 5 Drawing Sheets

STEPPING SCOOTER

BACKGROUND OF THE PRESENT INVENTION

1. Field of the Invention

The present invention relates to a scooter, and more particularly to a stepping scooter for a rider to step thereon so as to drive the stepping scooter moving forward.

2. Description of Related Arts

A conventional scooter comprises an elongated main rack, having a first end portion and a second end portion, a guiding wheel rotatably connected with the first end portion of the elongated main rack, a driven wheel rotatably connected with the second end portion of the elongated main rack, and a steering handle provided above the guiding wheel.

While riding on the conventional scooter, a rider has to apply a human power on a road surface with one of his or her feet, and step on the elongate rack with the other foot at the same time. As a result, the scooter is driven by the human power.

The conventional scooter has several drawbacks. On the one hand, when a human power is applied on a driving mechanism, the human power is converted into a rotation power. However, the transmitting efficiency is very low. On the other hand, the driving velocity of the conventional scooter is slower. Furthermore, when the above mentioned scooter drives on a road surface having a bad condition, it is dangerous for the rider.

SUMMARY OF THE PRESENT INVENTION

An object of the present invention is to provide a stepping scooter, comprising a driving system for a rider to step thereon so as to drive safely.

Another object of the present invention is to provide a stepping scooter, which comprises a pair of shaft units to effectively convert a human power into a rotation power so as to save physical force of the rider.

Another object of the present invention is to provide a stepping scooter, which comprises a transmission and speeding up arrangement for increasing a transmission velocity.

Another object of the present invention is to provide a stepping scooter, which is capable of driving at a uniform driving velocity.

Another object of the present invention is to provide a stepping scooter, which is adapted for different road surfaces.

Accordingly, in order to accomplish the above objects, the present invention provides a stepping scooter, comprising:

a scooter body for supporting a rider;

a moving system comprising a driving wheel rotatably connected with the scooter body, a driven wheel coaxially aligned with the driving wheel and a back unit engaging the driving wheel with the driven wheel so that when the driving wheel works, the driven wheel is capable of being driven at the same time;

a driving system comprising a driving arrangement comprising a pair of driving units pivotally connected to the scooter body, a first shaft unit provided at a left side of the scooter body and engaging with one of the driving units with the scooter body, and a second shaft unit provided at a right side of the scooter body and engaged the other of the driving units with the scooter body, and a transmission and speeding up arrangement comprising a cogged flywheel rotatably connected to the scooter body at the right side thereof and a gear wheel engaged with the cogged flywheel, wherein the gear wheel is rotatably connected with the driving wheel in such a manner that when a human power is applied on the driving system, the human power is converted into a rotation power such that the rotation power is increased by the cogged flywheel and the gear wheel according to a principle of machinery; and a steering lever mounted to the scooter body to control a driving velocity.

These and other objectives, features, and advantages of the present invention will become apparent from the following detailed description, the accompanying drawings, and the appended claims.

DETAILED DESCRIPTION OF THE PREFERRED EMBODIMENT

Figure 1:
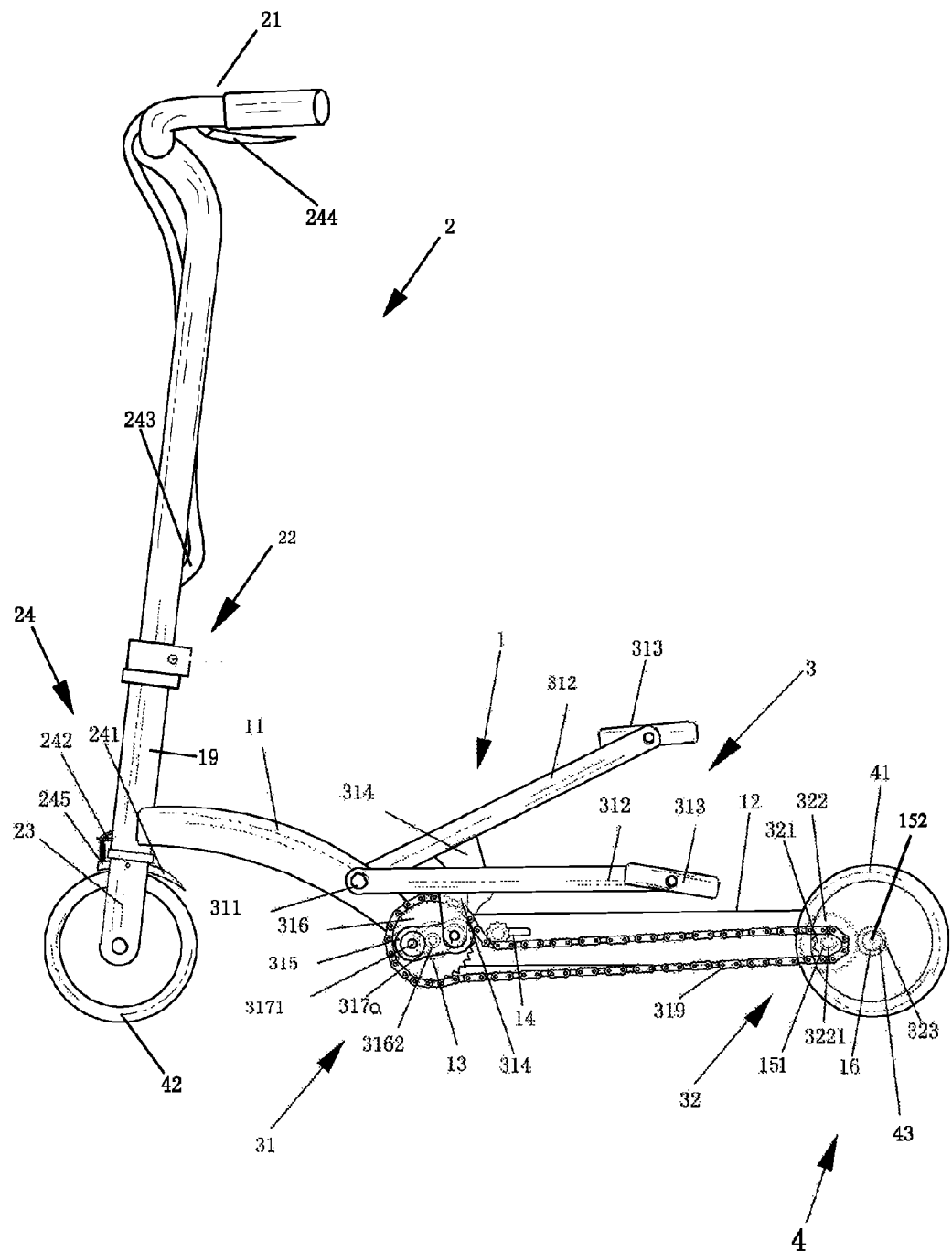
FIG. 1 is a perspective view of a stepping scooter according to a preferred embodiment of the present invention.
Figure 2:
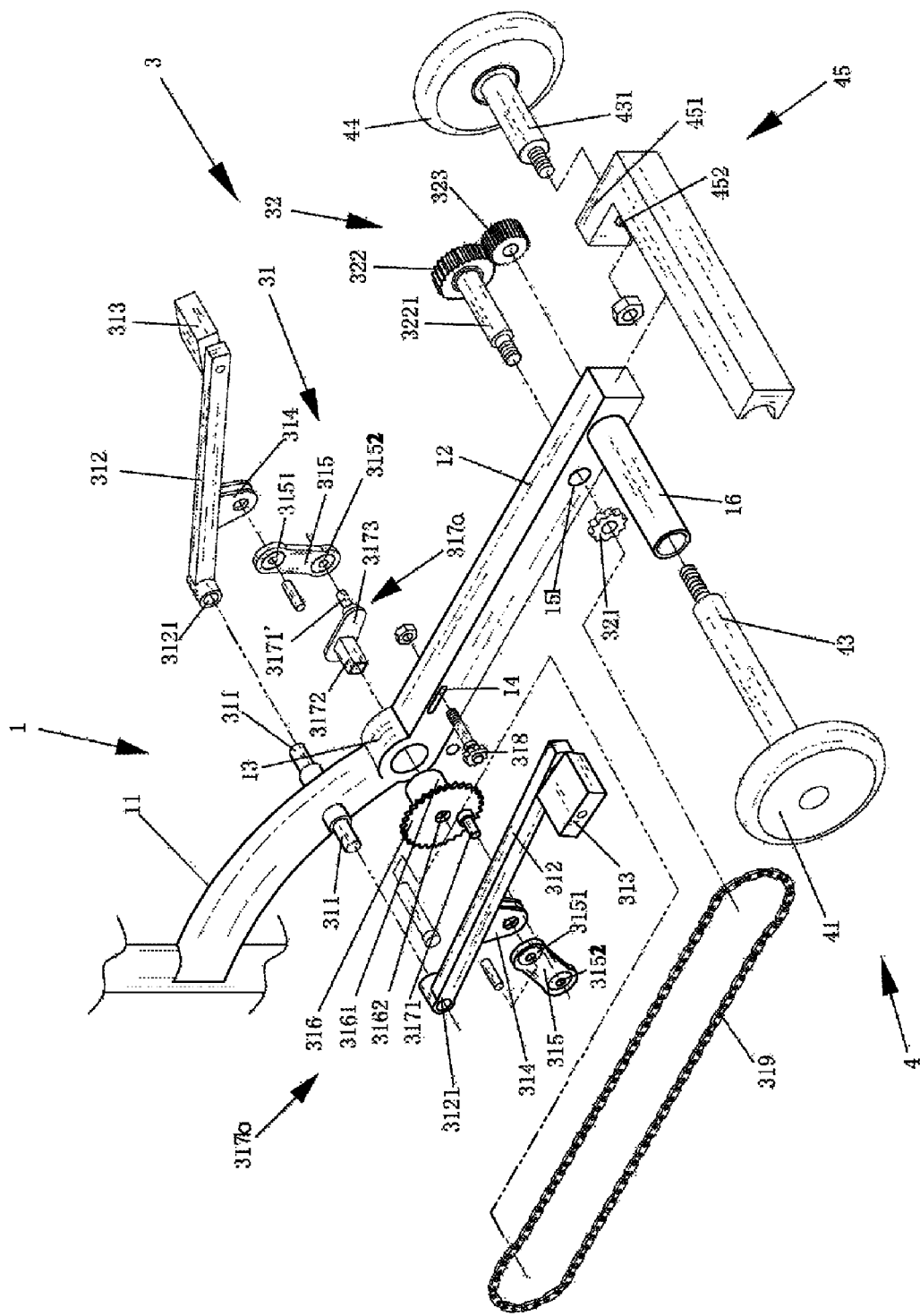
FIG. 2 is an exploded perspective view of the stepping scooter according to the above preferred embodiment of the present invention.
Figure 3:
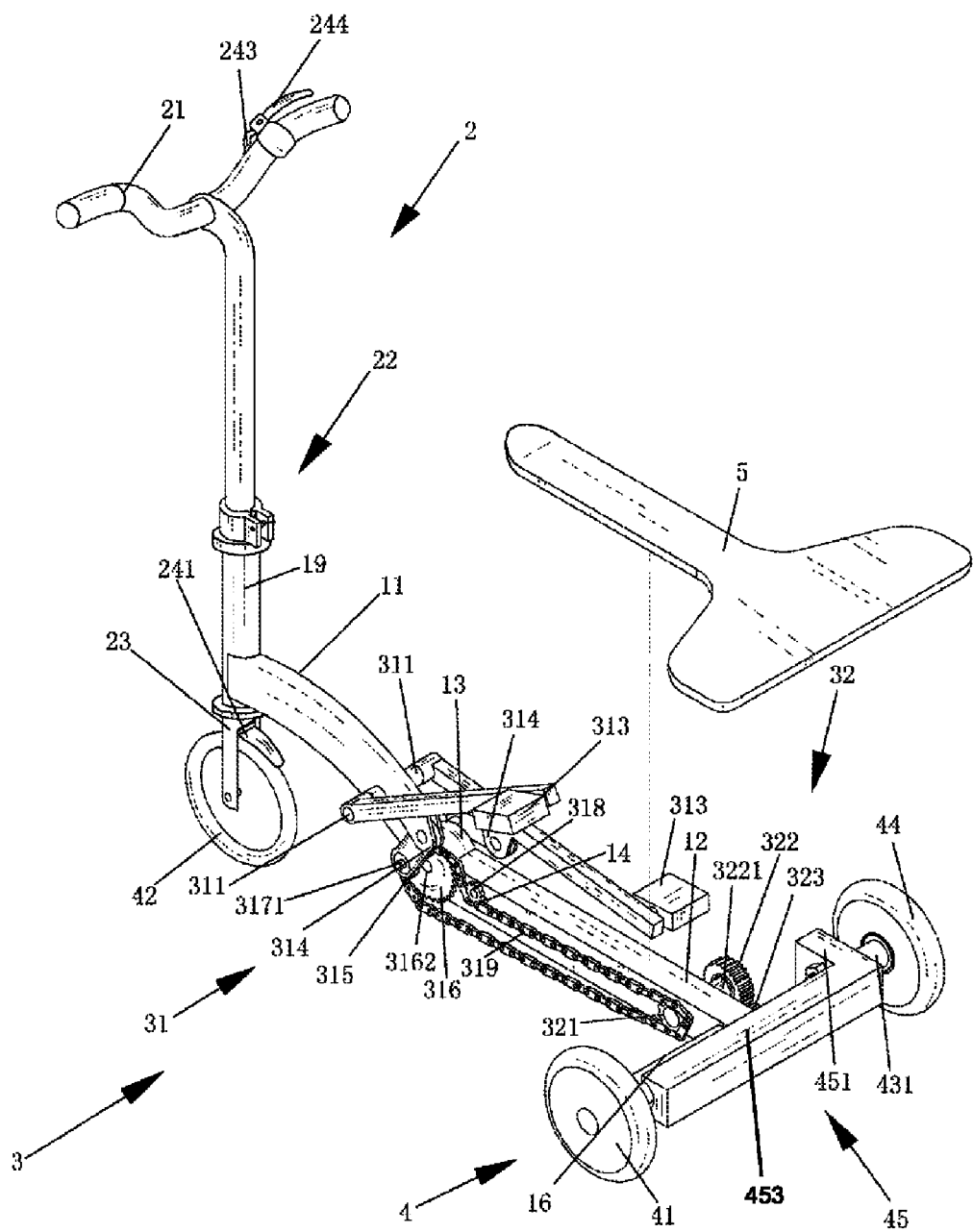
FIG. 3 is a side view of the stepping scooter according to the above preferred embodiment of the present invention.

Referring to FIGS. 1 to 3, a stepping scooter according to a preferred embodiment of the present invention is illustrated, in which the stepping scooter comprises a scooter body 1, a steering lever 2, a driving system 3 and a moving system 4.

The scooter body 1 comprises a head tube 19, a bridge rack 11 extended from the head tube 19, an elongated main rack 12 coaxially aligned with the bridge rack 11, having a free end portion, a first through hole 151 and a second through hole 152 spacedly and transversely formed on the free end portion in a perpendicular direction to an axis of the bridge rack 11, a bearing seat 13 provided between the bridge rack 11 and the elongated main rack 12 and aligned with the first through hole 151 and the second through hole 152, and an elongated tubular shaft 16 coaxially aligned with the second through hole 152 and mounted to the elongated main rack 12.

The moving system 4 comprises a driving wheel 41, a driving shaft 43 extended from the driving wheel 41, having a first engaged end portion, wherein the driving shaft 43 is coaxially aligned with the tubular shaft 16 in such a manner that the first engaged end portion is capable of penetrating through the second through hole 152 to engaged with the elongated main rack 12 so that the driving wheel 41 is rotatably connected to the elongated main rack 12.

Similarly, the moving system 4 further comprises a driven wheel 44, a driven shaft 431 extended from the driven wheel 44, having a second engaged end portion, and a guiding wheel 42.

The driven wheel 44 further comprises a driven bearing coaxially and pivotally connected with the driven shaft 431 so as to provide a better rotation.

In addition, the moving system 4 comprises a back unit 45, having an L-shaped, which comprises a first portion 453 and a second portion 451 provided at a right angle of the first portion 453, having a hole 452 coaxially aligned with the second through hole 152, wherein said first portion 453 contacts with said free end portion of said main rack 12 such that the second engaged end portion of the driven shaft 431 is capable of penetrating through the hole 452 to engage with the second portion 451 in such a manner that the driven wheel 44 is rotatably connected to the back unit 45 so that when the driving wheel 41 works, the driven wheel 44 is capable of being driven by the back unit 45 at the same time. It is worth to mention that the driving wheel 41 is symmetrical to the driven wheel 44.

The driving system 3 comprises a driving arrangement 31, a transmission and speeding up arrangement 32.

The driving arrangement 31 comprises a pair of driving units 310, wherein each of the driving units 310, comprises a positioning shaft 311 mounted to the bridge rack, a pedal arm 312, having a arm end 3121 pivotally connected to the positioning shaft 311, a pedal 313 attached to the pedal arm 312, a connecting arm 314 downwardly extended from the pedal arm 312, and a rotatable arm 315, having a first rotatable end 3151 pivotally connected with the connecting arm 314 and a second rotatable end 3152.

The driving arrangement 31 further comprises a first shaft unit 317b provided at a left side of the scooter body 1, which comprises a first core member 3161 pivotally connected with the bearing seat 13, a first chain wheel 316 coaxially aligned with the first core member 3161 and a first shaft connector 3171 coaxially positioned at the first chain wheel 316 and engaged with the second rotatable end 3152 of the rotatable arm 315 in such a manner that when a human power is applied on the pedal 313, the first chain wheel 316 is capable of rotating correspondingly.

Accordingly, the driving arrangement 31 further comprises a second shaft unit 317a provided at a right side of the scooter body 1, which comprises a second core member 3172 pivotally connected with the bearing seat 13, a crank 3173 mounted to the second core member 3172, and a second shaft connector 3171' aligned with the second core member 3172 and engaged with the second rotatable end 3152 of the rotatable arm 315, wherein the second core member 3172 is opposite to the second shaft connector 3171' in such a manner that when a human power is applied on the pedal 313, the crank 3173 is capable of rotating correspondingly.

It is worth to mention that the second core member 3172 is a non-cylinder tenon and the first core member 3161 has a mortise 3162 in such a manner that the non-cylinder tenon is engaged with the mortise 3162 such that the first shaft unit 317b is rotatably connect with the second shaft unit 317a to produce a differential motion so that the human power applied on the pedal 313 is converted into a rotational power of the first engaged unit 317b and the second engaged unit 317a.

The transmission and speeding up arrangement 32 comprises a second chain wheel 321 coaxially aligned with the first through hole 151 at the left side of the scooter body 1, a cogged flywheel 322, having a characteristic of forward-rotating and reverse idling, comprising a flywheel shaft 3221 rotatably connected to the second chain wheel 321 through the first through hole 151 at the right side of the scooter body 1 to mount on the elongated main rack 12, a gear wheel 323 engaged with the cogged flywheel, wherein the gear wheel 323 is rotatably connected with the first engaged end portion of the driving shaft 43 so as to mount the driving shaft 43 to the elongated main rack 12, and an endless transmission chain 319 linked between the first chain wheel 316 and the second chain wheel 321, wherein a diameter of the first chain wheel 316 is larger than that of the second chain wheel 321 in such a manner that when a human power is applied on the driving system, the human power is converted into a rotation power such that the rotation power is increased by the cogged flywheel and the gear wheel according to a principle of machinery.

The steering lever 2 comprises a steering handle 21 for supporting the rider, a folded portion 22 engaged with the steering handle 21, adapted for detaching and folding, a front fork 23 provided at a bottom of the folded portion 22 and rotatably connected with the guiding wheel 42, and a brake unit 24 connected with the front fork 23.

The brake unit 24 coaxially aligned with the head tube 19, comprises a brake member 241 rotatably connected to the front fork 23, a fastening member 242 positioned above the brake member 241, having a fastening hole, a brake handle 244, a brake cable 243 extended from the brake handle 244 to penetrate through the fastening hole of the fastening member 242, and an elastic member 245 coaxially mounted on the brake cable 243 in such a manner that at a braking position, the brake cable 243 is pulled to bias the brake member 241 against the guiding wheel 42 to control a rotational speed thereof, and at a driving position, the brake cable 243 is turned back by the elastic member 245 while loosing the brake handle 244.

According to the preferred embodiment of the present invention, the rotatable arm 315 has an 8-shaped to fittingly and shapedly engage between the driving units 310 and the first shaft unit 317b, the second shaft unit 317a respectively.

The number of teeth of the second chain wheel 321 is less than that of the first chain wheel 316 to increase the rotation speed.

In respect that the cogged flywheel 322 is engaged with the second gear wheel 323, the driving wheel 41 is still rotated even if the driving system 31 stops transmitting the human power under an effect of inertia. At the same time, the driving wheel 41 drives the gear wheel 323 to rotate.

Here, the cogged flywheel 322 is idlingly engaged with the gear wheel 323 to eliminate a possibility of transmitting reversely the rotation power to the second chain wheel 321 so as to prevent the rotation power from transmitting reversely to the pedal 313 to secure the rider.

Figure 4A:
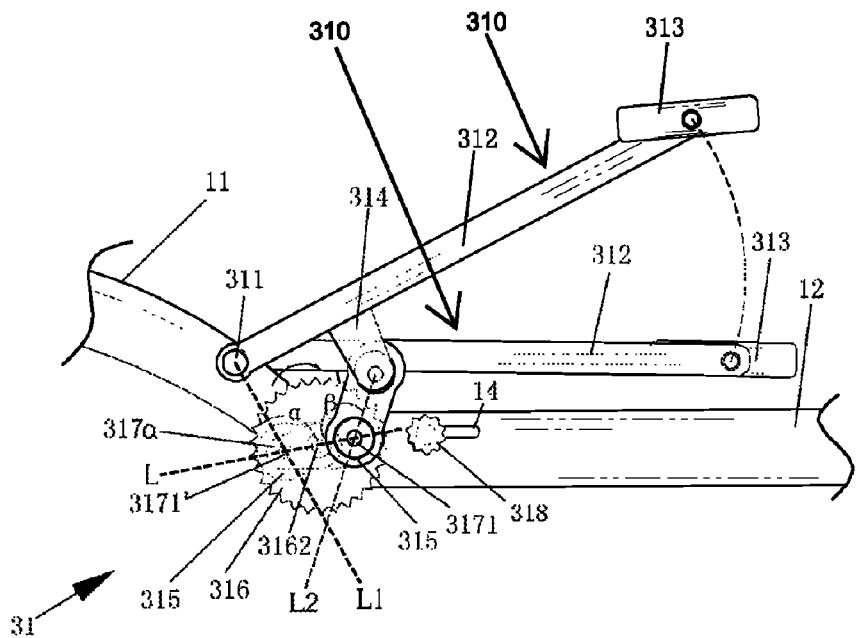
FIG. 4a is a partial view of a driving arrangement of the stepping scooter according to the above preferred embodiment of the present invention, illustrating the driving arrangement being turned in one direction.
Figure 4B:
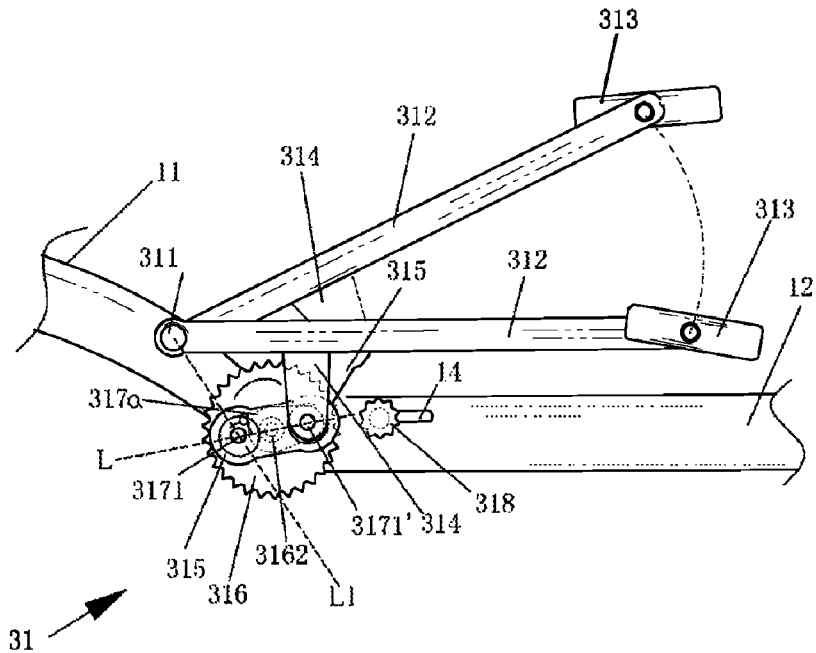
FIG. 4b is a partial view of a driving arrangement of the stepping scooter according to the above preferred embodiment of the present invention, illustrating the driving arrangement being turned in another direction.

Referring to FIGS. 4a and 4b, when the pedal 313 at the right side of the scooter body 1 is lifted up superlatively, the rotatable arm 315 at the left side of the scooter body 1 is coaxially aligned with an axis of bearing seat 13 to define a line L.

Accordingly, the arm end 3121 is coaxially aligned with the first rotatable end 3151 to define a line L1 at the left side of the scooter body 1. On the other hand, the rotatable arm 315 at the right side of the scooter body 1 defines a line L2.

The line L and the line L1 defines an angle $\alpha$, which is larger than 90° and smaller than 105° to comfort the rider. The line L and the line L2 defines an angle $\beta$, which is larger than 90° and smaller than 150° to rotate the first chain wheel 316 in a single direction.

Moreover, the scooter body, having a through slot 14, further comprises a third chain wheel 318 rotatably mounted to the elongated main rack 12 by the through slot 14, wherein the third chain wheel 318, coaxially arranged with the first chain wheel 316 and pivotally connected to the elongated main rack 12, has a bottom teeth portion to engage with the endless transmission chain 319 to prevent said endless transmission chain 319 from sliding off.

That is to say, the endless transmission chain 319 is externally engaged with said third chain wheel 318, and the endless transmission chain 319 is internally engaged with the first chain wheel 316 and the second chain wheel 321.

The through slot 14 has a predetermined length so that the third chain wheel 318 is capable of sliding therein to fasten said endless transmission chain 319.

Here, the first chain wheel 316, the second chain wheel 321 and the third chain wheel are trisection gear teeth. The endless transmission chain 319 is trisection transmission chain.

The first chain wheel 316, the cogged flywheel 322 and the third chain wheel 318 is made of high intensity and light weight materials, such as plastics, nylon plastics and colophony so as to reduce a total weight of the scooter in accordance with the demand of intensity. The second chain wheel 321 and the gear wheel 323 is made of materials having a predetermined wear resistance, such as iron, aluminum, steel, stainless steel and alloy. Therefore, as a result of different performances of materials, the different components are engaged well with each other to comfort the rider.

Moreover, the scooter further comprises a plastic cover 5, having a T-shaped, detachably mounted to the elongated main rack 12 to shield the elongated main rack 12 and the back unit 45.

The driving wheel 41, the driven wheel 44 and the guiding wheel 42 are solid wheels having plastic wheel hub pivotally connected with the scooter body 1.

Figure 5:
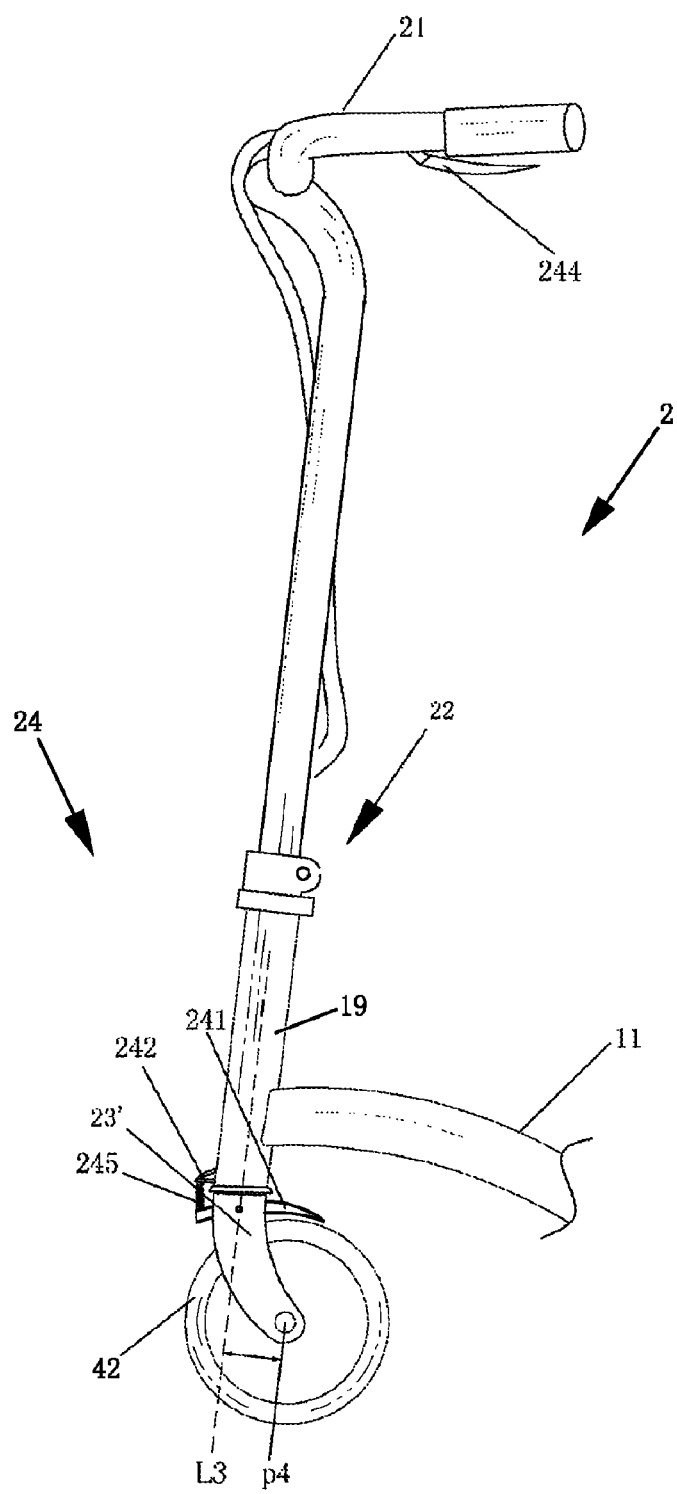
FIG. 5 is a partial view of a first alternative mode of a front fork of the stepping scooter according to the above preferred embodiment of the present invention.

FIG. 5 is a partial view of a first alternative mode of the front fork of the stepping scooter according to the above preferred embodiment of the present invention, wherein the front fork 23' pivotally connected to an axis P4 of the guiding wheel 42, has an arched shape, wherein a position of the axis P4 is located nearer to the rider than that of an axis L3 of the steering handle 21 in such a manner that when the guiding wheel 42 turns the corner, the front fork 23' is bent backwardly and the guiding wheel 42 leans backwardly so that a barycenter deviation force of the stepping scooter inclines to a turning direction at this time. Moreover, a centrifugal force of the stepping scooter while turning the corner is opposed to the turning direction. The barycenter deviation force and the centrifugal force keep the stepping scooter balance to prevent the rider from falling off so as to avoid an accident.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A stepping scooter, comprising:
a scooter body comprising:
a head tube;
a bridge rack extended from said head tube;
an elongated main rack coaxially aligned with said bridge rack, having a free end portion, a first through hole and a second through hole spacedly and transversely formed through said free end portion in a perpendicular direction to an axis of said bridge rack;
a bearing seat provided between said bridge rack and said elongated main rack; and
an elongated tubular shaft coaxially aligned with said second through hole and mounted to said elongated main rack;

a moving system comprising:
a driving wheel;
a driving shaft extended from said driving wheel, having a first engaged end portion, wherein said driving shaft is coaxially aligned with said tubular shaft in such a manner that said first engaged end portion is capable of penetrating through said tubular shaft by said second through hole to engage with said elongated main rack so that said driving wheel is rotatablcly rotatably connected to said elongated main rack;
a driven wheel;
a driven shaft extended from said driven wheel, having a second engaged end portion;
a guiding wheel;
a back unit comprising a first portion and a second portion extended from said first portion, said second portion having a hole coaxially aligned with said second through hole, wherein said first portion contacts with said free end portion of said main rack such that said second engaged end portion of said driven shaft is capable of penetrating through said hole to engage with said second portion in such a manner that said driven wheel is rotatably connected to said back unit so that when said driving wheel rotates, said driven wheel is capable of being driven at the same time;
a driving system comprising:
a driving arrangement comprising a pair of driving units, wherein each of said driving units comprises a positioning shaft mounted to said bridge rack, a pedal arm, having an arm end pivotally connected to said positioning shaft; a pedal attached to said pedal arm; a connecting arm downwardly extended from said pedal arm; and a rotatable arm, having a first rotatable end pivotally connected with said connecting arm, and a second rotatable end; a first shaft unit provided at a left side of said scooter body comprising a first core member pivotally connected with said bearing seat; a first chain wheel coaxially aligned with said first core member;
and a first shaft connector coaxially positioned at said first chain wheel and engaged with said second rotatable end of said rotatable arm in such a manner that when a human power is applied on said pedal, said first chain wheel is capable of rotating correspondingly; and a second shaft unit provided at a right side of said scooter body comprising a second core member pivotally connected with said bearing seat; a crank mounted to said second core member; and a second shaft connector aligned with said second core member and engaged with said second rotatable end of said rotatable arm, wherein said second core member is opposite to said second shaft connector in such a manner that when a human power is applied on said pedal, said crank is capable of rotating correspondingly; and
a transmission and speeding up arrangement, comprising a second chain wheel coaxially aligned with said first through hole at said left side of said scooter body, a cogged flywheel, having a characteristic of forward-rotating and reverse idling, comprising a flywheel shaft rotatably connected to said second chain wheel through said first through hole at said right side of said scooter body to mount on said elongated main rack, a gear wheel engaged with said cogged flywheel, wherein said gear wheel is rotatably connected with said first engaged end portion of said driving shaft so as to mount said driving shaft to said elongated main rack, and an endless transmission chain linked between said first chain wheel and said second chain wheel, wherein a diameter of said first chain wheel is larger than that of said second chain wheel in such a manner that when a human power is applied on said driving system, the human power is converted into a rotation power such that the rotation power is increased by said cogged flywheel and said gear wheel according to a principle of machinery; and a steering lever comprising:

a steering handle for supporting a rider; and a front fork provided at a bottom of said steering handle and rotatably connected with said guiding wheel.

2. The stepping scooter, as recited in claim 1, wherein said rotatable arm at said left side of said scooter body is coaxially aligned with an axis of said bearing seat to define a line L when said pedal at said right side of said scooter body is lifted up superlatively, wherein said arm end is coaxially aligned with said first rotatable end to define a line L1 at said left side of said scooter body, wherein said rotatable arm at said right side of said scooter body defines a line L2, wherein said line L and said line L1 defines an angle α, which is larger than 90° and smaller than 105°, wherein said line L and said line L2 defines an angle β, which is larger than 90° and smaller than 150° to rotate said first chain wheel in a single direction.

3. The stepping scooter, as recited in claim 1, wherein said scooter body, having a through slot, further comprising a third chain wheel rotatably mounted to said elongated main rack by said through slot, wherein said third chain wheel is coaxially arranged with said first chain wheel and pivotally connected to said elongated main rack to exterior engage with said endless transmission chain, wherein said through slot has a predetermined length so that said third chain wheel is capable of sliding therein to prevent said endless transmission chain from sliding off.

4. The stepping scooter, as recited in claim 1, wherein said front fork is pivotally connected to an axis P4 of said guiding wheel, and has an arched shape, wherein said axis P4 is positioned rearward of an axis L3 of said steering handle.

5. The stepping scooter, as recited in claim 1, wherein said first chain wheel, said cogged flywheel and said third chain wheel are made of high intensity and light weight materials so as to reduce a total weight in accordance with a demand of intensity, wherein said second chain wheel and said gear wheel are made of materials having a predetermined wear resistance, engaged plastics with metals.

6. The stepping scooter, as recited in claim 1, wherein said steering lever further comprises a folded portion provided between said steering handle and said front fork so that said steering handle is capable of detaching from and attaching to said front fork.

7. The stepping scooter, as recited in claim 1, wherein said steering lever further comprises a brake unit coaxially aligned with said head tube and comprising a brake member rotatably connected to said front fork, a fastening member positioned above said brake member, having a fastening hole, a brake handle, a brake cable extended from said brake handle to penetrate through said fastening hole of said fastening member, and an elastic member coaxially mounted on said brake cable in such a manner that at a braking position, said brake cable is pulled to bias said brake member against said guiding wheel to control a rotational speed thereof, and at a driving position, said brake cable is turned back by said elastic member while loosing said brake handle.

8. The stepping scooter, as recited in claim 1, wherein an amount of teeth of said second chain wheel is less than that of said first chain wheel to form a first speeding up, wherein an amount of teeth of said cogged flywheel is more than that of said gear wheel to form a second speeding up so as to increase a rotation speed according to a principle of machinery.

9. The stepping scooter, as recited in claim 1, wherein said second core member is a non-cylinder tenon and said first core member has a mortise in such a manner that said non-cylinder tenon is engaged with said mortise such that said first shaft unit is rotatably connected with said second shaft unit to produce a differential motion so that the human power applied on said pedal is converted into a rotational power of said first engaged unit and said second engaged unit.

10. The stepping scooter, as recited in claim 1, wherein said rotatable arm has an 8-shape, made of high intensity plastic material to fittingly engage between said driving units, said first shaft unit and said second shaft unit respectively.

11. The stepping scooter, as recited in claim 1, wherein said driving wheel, said driven wheel and said guiding wheel are solid wheels having plastic wheel hubs pivotally connected with said scooter body.

12. The stepping scooter, as recited in claim 1, wherein said driven wheel, provided at said right side of said scooter body, further comprises a driven bearing coaxially and pivotally connected with said driven shaft.

13. The stepping scooter, as recited in claim 1, wherein said back unit has an L-shape, wherein said second portion is provided at a right angle of said first portion.

14. The stepping scooter, as recited in claim 1, wherein said first chain wheel, said second chain wheel and said third chain wheel have trisection gear teeth, and said endless transmission chain is a trisection transmission chain.

15. The stepping scooter, as recited in claim 1, further comprising a plastic cover, having a T-shape, detachably mounted to said elongated main rack to shield said elongated main rack and said back unit.

\* \* \* \* \*